(12) United States Patent
Bruijns et al.

(10) Patent No.: US 6,515,668 B1
(45) Date of Patent: Feb. 4, 2003

(54) COMPUTER GRAPHICS ANIMATION METHOD AND DEVICE

(75) Inventors: Johannes Bruijns, Eindhoven (NL); Cornelis W. A. M. Van Overveld, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/345,341

(22) Filed: Jul. 1, 1999

(30) Foreign Application Priority Data

Jul. 1, 1998 (EP) .............................. 98202214

(51) Int. Cl.[7] .............................................. G06T 17/00
(52) U.S. Cl. ............................................... 345/473
(58) Field of Search ................... 345/419, 425, 345/473, 474, 475

(56) References Cited

U.S. PATENT DOCUMENTS 5,818,463 A * 10/1998 Tao et al. ................. 345/473
5,903,682 A * 5/1999 Chun ........................ 382/276
5,966,141 A * 10/1999 Ito et al. ................... 345/473

\* cited by examiner

*Primary Examiner*—Cliff N. Vo
(74) *Attorney, Agent, or Firm*—Russell Gross

(57) ABSTRACT

An implicit surface is defined by a time dependent implicit surface model. From the implicit surface model a first and second mesh of control points of a first and second non-linear coordinate valued functions such as second degree Bezier functions are computed respectively. The first and second non-linear coordinate valued function represent approximations of the implicit surface at a first and second point in time respectively. The points of the first mesh are used as a starting point for computing an approximation of the second mesh of points. The surfaces defined by the first and second non-linear coordinate valued function respectively are rendered for example by approximating each by a respective mesh of flat triangles.

12 Claims, 2 Drawing Sheets

COMPUTER GRAPHICS ANIMATION METHOD AND DEVICE

BACKGROUND OF THE INVENTION

The invention relates to a computer graphics animation method as described in the preamble of claim 1.

Such a method is known from a Masters thesis by D. Dekkers, laid open at the Technical University of Eindhoven in February 1997.

Implicit surface definitions form a powerful tool for defining a surface with a variable shape for use in computer graphics. The implicit surface is defined by means of a function whose arguments are coordinates in the space in which the surface lies. The points on the implicit surface are points whose coordinates satisfy an equation involving this function. For example, a spherical surface can be defined by means of a function which is the sum of squares of the coordinates, by requiring that for points on the surface the function should have a predetermined positive value. Other, more complicated surfaces can be defined by combining (e.g. adding) functions in the equation.

Although an implicit surface definition is a powerful tool for defining a surface, such a definition is less convenient for actually rendering the surface, i.e. for computing an image of a scene containing the surface.

Dekkers proposes to compute from the implicit surface definition a mesh of flat triangles and to render that mesh using flat triangles.

This is attractive because available hardware for rendering surfaces is optimized for surfaces that are made up of a mesh of flat triangles. The linear properties of the equations that describe such triangles make it possible to render such triangles at great speed with high efficiency.

Hardware that does not use flat triangles is an unattractive alternative: non-linear surface definitions which require the solution of non-linear equations to find points on the surface cannot be rendered with such great speed. Moreover, most graphics tasks require mostly or only flat triangles so any hardware for rendering implicit surfaces must be provided in addition to available hardware that is optimized for rendering flat triangles.

Implicit surface definitions are very suitable for defining an animated surface with a time-varying shape, for example by using a function which is the sum of two sub-functions and translating or rotating one of the sub-function relative to the other as a function of time.

Preferably, images of such animated surfaces with time varying shape should be computed in real-time, that is, as fast as these images replace one another on a display device. This is convenient for example for computer game applications in which the shape is controlled interactively by a player.

However, computation of a mesh of flat triangles from an implicit surface definition is very time consuming. Generally it is needed to solve the equation containing the function iteratively, because the function is non-linear. In addition, corner points in the mesh have to be distributed over the surface in order to limit the approximation errors introduced by approximating the surface by flat triangles and in order to avoid that too many flat triangles need to be rendered.

Dekker has proposed to reduce the time needed to compute the mesh of flat triangles during animation by using the corner points of the mesh which have been computed for an image at first point in time as a starting point for computing corresponding corner points of the mesh for an image at a second point in time, close to the first point in time. Thus only a few iterations are needed to obtain updated corner points which provide a sufficient approximation of the surface. The distribution of the corner points can also largely be taken over from the first point in time. Dekkers proposes to incorporate in the iterations a shift of the corner points parallel to the surface in order to maintain an optimal distribution.

However, Dekkers's method is still very time consuming and leaves animation using implicit surface definitions an expensive option for computer graphics.

SUMMARY OF THE INVENTION

It is an object of the invention to make it possible to speed up computer animation using implicit surface models.

The method according to the invention is characterized by the characterizing part of claim 1.

According to the invention the implicit surface definition is used to compute control points of a non-linear coordinate valued function which approximates the implicit function. A coordinate valued function is a function which assigns coordinates on a surface to arguments which parametrize a position on a surface. An example of a coordinate valued function is a weighted sum of Bernstein polynomials such as used to define a Bezier shape.

Because a non-linear coordinate valued function is more powerful for describing curved shapes than a flat triangle, much less control points need to be computed for an approximation with a given accuracy than in the case that the implicitly defined surface is approximated by a mesh of flat triangles.

Subsequently, the coordinate valued function is used to compute the corner points in a mesh of flat polygons. This computation can be performed much faster than when the corner points are computed directly from the implicit surface definition. Because the computation of corner points from a coordinate valued function can also be applied to other rendering problems it is economically more attractive to provide dedicated hardware for this computation, making the method even faster.

During animation the control points of the coordinate valued function at a first point in time are used as a starting point for computing the control points of the coordinate valued function at a second point in time. Thus, the time consuming iterations are only performed for the control points and not for all corner points of the mesh of flat polygons. As a result, the computation time needed for iteration is reduced.

In an embodiment of the method according to the invention the non-linear coordinate function corresponds to a mesh of abutting second degree triangles. This is a surface representation that is particularly suitable for conversion to flat triangles.

BRIEF DESCRIPTION OF THE DRAWINGS

These and other advantageous aspects of the invention will be described in a non-limitative way using figures.

DETAILED DESCRIPTION OF THE PREFERRED EMBODIMENT

Inplicit surface definitions are a powerful tool for defining the shape surfaces for use in computer graphics. An implicit definition of a surface can generally be written in the form of an equation $$F(x,y,z)=C$$

This equation defines a collection of points with coordinates (x,y,z) which satisfy this equation. An example of such a definition is the definition of a set of points which form the surface of a sphere. In this case one may use the function $$F(x,y,z)=(x-x0)^2+(y-y0)^2+(z-z0)^2$$

when C>0, the collection of points with coordinates (x,y,z) that satisfy the equation F(x,y,z)=C is the surface of a sphere.

Implicit surface definitions are interesting for applications in computer graphics because they form a powerful method for defining surfaces. For example, one may compose the function F(x,y,z) from several sub-functions, each of which on its own would implicitly define a basic shape. The composition describes a combination of these basic shapes with smooth transitions between the shapes. For example, one may define a surface made up of a combination of the surfaces of two spheres using the function $$F(x,y,z)=F1(x,y,z)+F2(x,y,z)$$

this function F(x,y,z) is made up of two subfunctions $$F1(x,y,z)=A1/\{1+(x-x1)^2+(y-y1)^2+(z-z1)^2\}$$

$$F2(x,y,z)=A2/\{1+(x-x2)^2+(y-y2)^2+(z-z2)^2\}$$

Each of these functions on its own could be used to define the surface of a sphere according to F1(x,y,z)=C and F2(x,y,z)=C around positions with coordinates (x1,y1,z1) and (x2,y2,z2) respectively. The combined function defines a smooth combination of these surfaces.

Although the example uses spheres, implicit definitions can of course be used to define any other kind of surface. With no more than simple quadratic functions one can already define shapes like planes, cylinders, cones etc and combinations thereof.

During animation surfaces with a time varying shape can be created simply by using functions with time varying parameters. For example, the surface created by combining the surfaces of two spheres can be deformed by varying the parameters A1, (x1,y1,z1) and A2, (x2,y2,z2) of the component functions in time (the parameters (x1,y1,z1) and (x2,y2,z2) are also called control points of the function F).

Figure 1:
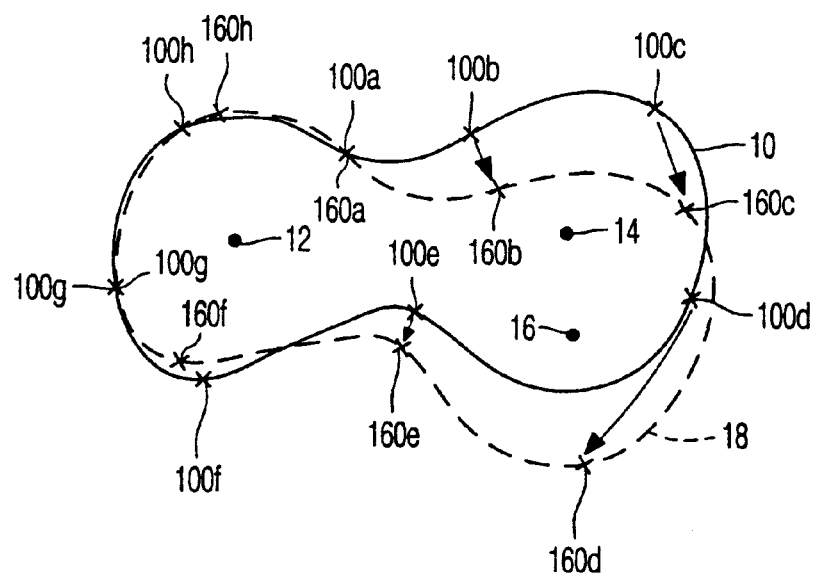
FIG. 1 shows an example of a time dependent surface

FIG. 1 shows an example of a cross-section 10 through an implicitly defined surface defined using two component functions with center points 12, 14 respectively (for example with coordinates x1,y1,z1 and x2,y2,z2 respectively). FIG. 1 also shows a cross-section 18 (dashed line) through the surface when it has evolved in time because one of the center points 14 has been moved to a point 16.

Although implicit definitions of this type are a powerful tool for modelling surfaces, they are less suitable for efficient direct rendering of those surfaces, that is for computing the values of the pixels of an image containing such a surface. This is because direct rendering of an implicit definition would require solving the equation F(x,y,z) a larger number of times.

This may lead to problems, especially in computer graphics devices that have to operate under real-time constraints such as interactive devices that adapt the surface shape as a function of user response to the surface, for example in computer games. To overcome these problem an indirect rendering method is proposed wherein the implicit definition of the surface is first converted to an intermediate definition before rendering takes place.

Figure 2:
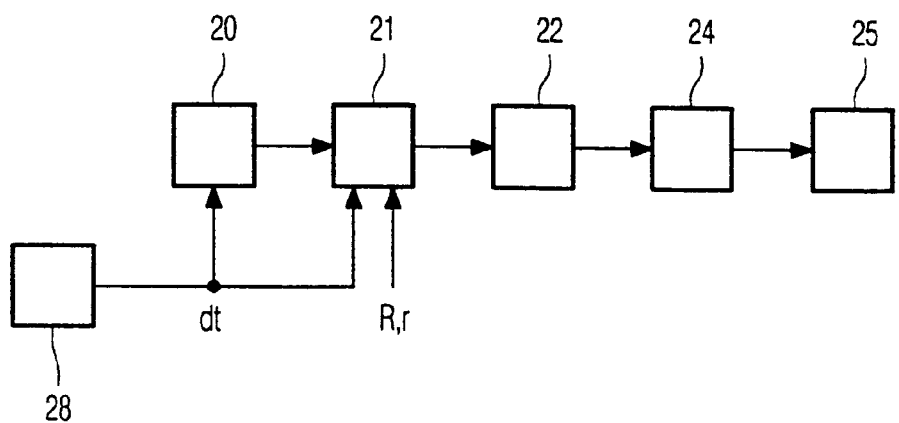
FIG. 2 shows an apparatus for rendering an implicitly defined surface

FIG. 2 shows a computer graphics device for rendering implicitly defined surfaces. This device contains a first module 20 for generating an implicit surface model. The first module 20 is coupled to a first conversion unit 21 for converting an implicit surface definition into definition of a surface in terms of Bezier triangles. An output of the first conversion unit 21 is coupled to an input of a second conversion unit 22 for converting the definition in terms of Bezier triangles into a definition in terms of flat triangles. The second conversion unit 22 has an output coupled to an input of a flat triangle rendering unit 24 which converts the definition in terms of flat triangles into an image of the surface. An output of the flat triangle rendering unit 24 is coupled to a display device 25. A time update signalling unit 28 is coupled to the first module 20 and the first conversion unit 21.

Figure 3:
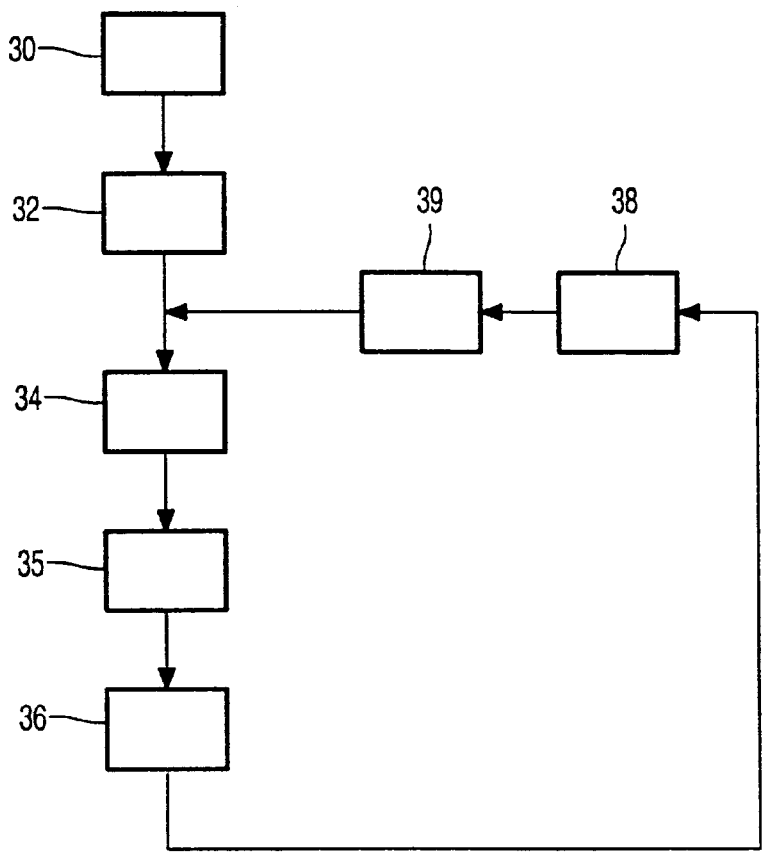
FIG. 3 shows a flow-chart for rendering an implicitly defined surface

FIG. 3 shows a flow-chart describing the operation of the device. The flow-chart contains a first step 30 in which an implicit model of a surface like the surface 10 of FIG. 1 is generated by choosing a number of appropriate functions and parameters (like A1, x1,y1,z1 etc.) of these functions. In a second step 32 of the flow-chart, the definition of these functions is used to compute the coordinates of a number of control points 100*a–h* which define an approximation of the surface for example in terms of second order Bezier triangles.

In a Bezier triangle a surface patch is defined by a coordinate valued function G(u,v)=(X(u,v),Y(u,v),Z(u,v)) which assigns three dimensional coordinates (X,Y,Z) to surface coordinate pairs (u,v): for any surface coordinate pair (u,v) within the domain of the function G, G defines a computation of X,Y,Z. If G is a Bezier function for example, $$G(u,v)=Sum_{klm}R_{klm}\,u^k v^l(1-u-v)$$

Where $R_{klm}$ for different indexes k,l,m are coordinate vectors of a number of control points.

The coordinates of points on the surface can be computed much faster using coordinate valued functions than using an implicit definition. In particular if polynomial coordinate valued functions of a low degree (e.g. second degree) are used the computation can be very fast, for example using forward difference methods to compute the XYZ coordinates assigned to points that are evenly spaced in uv space.

In case Bezier functions are used, the second step 32 decides from the implicit definition how many different surface patches should be used to approximate the implicitly defined surface and the second step computes the coordinates of a number of those control points R for each of those patches.

In a third step 34 of the flow-chart, the coordinate valued functions are used to compute coordinates of corner points of a mesh of flat triangles which in turn approximates the surface patches defined by the coordinate valued functions.

Figure 4:
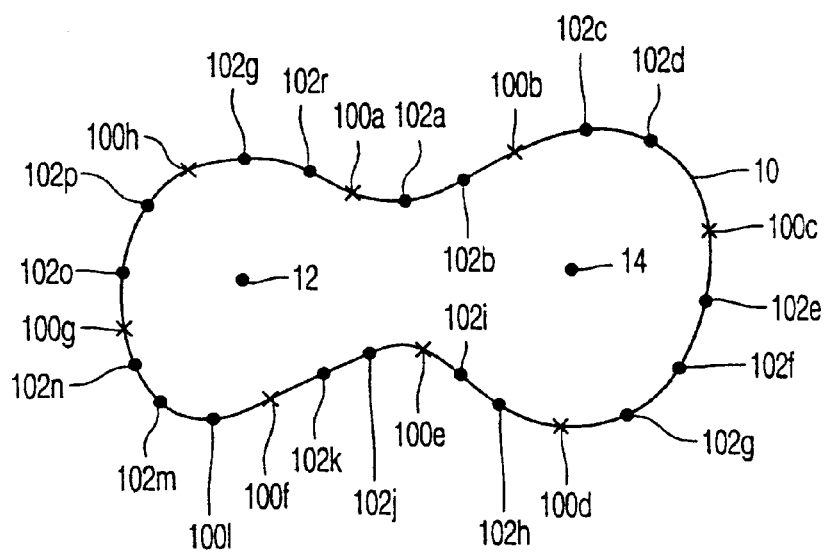
FIG. 4 shows a split-up of a surface at a point in time.

FIG. 4 symbolically displays such a set of corner points in two dimensions. The surface 10 contains control points 100*a–h*, which in this two-dimensional example define curved line patches that stand for curved surface patches. From the control points 100*a–h*, corner points 102*a–r* have been computed, which define straight line segments which connect pairs of successive corner points 102*a–r*; the straight line segments stand symbolically for flat triangles.

In a fourth step 35 of the flow-chart, the coordinates of the corner points of the mesh of flat triangles are used to compute the content of pixels in an image of the surface. In a fifth step 36 of the flow-chart this image is displayed.

For the purpose of the fourth step 35 it may be required to apply viewing transformations to the surface. Viewing transformations include transformations to represent the surface in a coordinate system relative to the viewpoint. Such a viewing transformation may include adding a translation vector to the coordinates of points of the surface (to account for the position of the selected viewpoint) and multiplying these coordinates with a rotation matrix (to account for the orientation of the notional camera with which the view must be taken).

Preferably, the viewing transformations are applied to the coordinates of the control points 100a–h and the coordinates of the cornerpoints are computed from the transformed control points 100a–h. Thus, no viewing transformations need to be applied to the coordinates of the cornerpoints, which reduces the amount of computation needed to perform the flow-chart of FIG. 3.

In a sixth step 38 of the flow-chart, the implicit surface model is updated, so that it corresponds to a second time point following the first time point for which the image was rendered in the preceding steps.

Returning to FIG. 1, FIG. 1 shows a cross-section of the model as it pertains at the second time-point. By way of example it is seen that the center 12 of one of the spheres has moved to a new position 16, thus altering the function F(x,y,z) so that it implicitly defines new surface 18 for the second point in time.

A seventh step 39 of the flow-chart is executed following the sixth step. In the seventh step 39, the coordinates R of control points 100a–h (which were used to approximate the surface by coordinate valued functions) are now used as initial values for the coordinates R' of new control points 160a–h used to approximate the surface at the second point in time. From these initial values R, new values R' are computed, for example by means of a recursion relation $$R^{(n+1)} = R^{(n)} 31\ S_n$$

$$S_n = a^* grad\ F(R^{(n)})$$

Where $R^{(0)} = R$ and $R' = R^{(n)}$ for some n (e.g. n=1). Thus, the point R moves a step $S_n$ in the direction of the gradient e.g. with "a" proportional to $$(F(R^{(n)}) - C)/(grad(F(R^{(n)})))^2.$$

In addition, terms may be added to $S_n$ so that the points 100a–h move in a way that keeps the distribution of the control points 160a–h appropriate for the surface (few points in relatively flat areas of the surface and more points in strongly curved areas). The masters thesis by Dekkers describes how this can be done for corner points of flat triangles, e.g. by adding to $S_n$ a vector tangential to the surface (perpendicular to grad(F(R))) for example so that the control points repel each other, and/or by adding to $S_n$ a vector in the direction of change of the control points 12, 14 of the implicit function F so as to make the control points 100a–h of the coordinate valued functions follow the movements of one or more control points 12, 14 of the implicit function F. Similar methods may be applied to the control points 160a–h of the coordinate valued functions of the present invention.

FIG. 1 indicates the movement of the initial control points 100a–h to new control points 160a–h by arrows.

After the seventh step 39, a new (approximate) set of coordinates of control points 160a–h is available and with this set, the flow-chart is repeated for the second time point as from the third step 34. That is, the second step 32, in which the coordinates of the control points 100a–h are computed initially is not repeated for the control points 160a–h for the second time point, but the step wherein the coordinates of the corner points 102a–r of the mesh of flat triangles is computed is repeated for the second time point and the coordinates of the corner points 102a–r of the mesh of flat triangles are computed anew for the second time point, and not obtained by using the previously computed corner points for the first time point as an initial approximation.

Although most of the steps of the flow chart of FIG. 3 may be executed successively by a single general purpose computer, it is preferred that a least some of the steps are executed by different devices in a pipe-lined fashion, e.g. so that the computation of the new control points 160a–h is started in the first conversion unit 21, at a time when the rendering unit 24 is still processing the flat triangles computed for the preceding control points 100a–h.

The amount of computation required to compute new coordinates of control points in the seventh step 39 may vary depending on the amount of change in the implicitly defined surface. Under certain circumstances this may lead to the possibility that the coordinates of the cornerpoints of the mesh of flat triangles can not be computed fast enough in order to satisfy real-time constraints. In this case, it may be convenient to use previously computed coordinates for part of the cornerpoints in the third step 34 instead of computing all cornerpoints anew. Thus time is gained to satisfy real time constraints. As the cornerpoints, if they are computed, are computed anew each time, this does not introduce any cumulative errors. The number of cornerpoints that is computed anew may be adapted so that the necessary amount of computation in the seventh 39 plus third step 34 does not exceed a maximum allowable for real-time computation.

What is claimed is:

1. A computer graphics animation method comprising the steps of
   providing a time dependent implicit surface model;
   computing a first mesh of points representing an approximation of the implicit surface at a first point in time;
   using the points of the first mesh as a starting point for a computation of a second mesh of points representing an approximation of the implicit surface at a second point in time; characterized in that the method comprises the steps of
   using the first and the second mesh of points as control points of a first and second non-linear coordinate valued function;
   rendering surfaces defined by the first and second non-linear coordinate valued function respectively.

2. A computer graphics animation method according to claim 1, wherein the rendering step comprises computing from the first and second mesh of control points cornerpoints of a first and second mesh of flat triangles respectively, the first and second mesh of flat triangles approximating the surfaces defined by the first and second coordinate valued functions respectively, surfaces defined by said mesh of flat triangles being rendered.

3. A computer graphics animation method according to claim 2, wherein viewing transformations are applied to the first and second mesh of control points, the cornerpoints being computed from transformed control points.

4. A computer graphics animation method according to claim 1, wherein the coordinate valued functions are second degree Bezier functions defined over Bezier triangles.

5. A computer graphics animation method according to claim 1, the implicit surface model being defined by means of a function of coordinate values, coordinates of all points on the surface resulting in the same function value, wherein the points of the second mesh are computed by adding a term in a direction of a local gradient of said function to the points of the first mesh.

6. A computer graphics animation method according to claim 2, wherein a part of the cornerpoints of the second mesh of flat triangles is computed from the second mesh of control points, a remaining part of the cornerpoints of the second mesh of flat triangles being copied from the cornerpoints of the first mesh of flat triangles, a size of said part being adjusted so that the amount of computation required for the method is kept below a maximum allowable under real-time constraints.

7. A computer graphics device comprising
an input for receiving parameters of a time dependent implicit surface model;
a computing unit arranged for computing a first mesh of points representing an approximation of the implicit surface at a first point in time, the computing unit being arranged to use the points of the first mesh as a starting point for a computation of a second mesh of points representing an approximation of the implicit surface at a second point in time; characterized in that the device comprises a conversion unit arranged to use the first and the second mesh of points as control points of a first and second non-linear coordinate valued function and in that the device comprises a rendering unit for rendering surfaces defined by the first and second non-linear coordinate valued function respectively.

8. A computer graphics device according to claim 7, wherein the rendering unit comprises
a further conversion unit arranged to compute from the first and second mesh of control points cornerpoints of a first and second mesh of flat triangles respectively, the first and second mesh of flat triangles approximating the surfaces defined by the first and second coordinate valued functions respectively,
a flat triangle rendering unit for rendering surfaces defined by said mesh of flat triangles.

9. A computer graphics device according to claim 8, the device being arranged to apply viewing transformations to the first and second mesh of control points, the cornerpoints being computed from transformed control points.

10. A computer graphics device according to claim 7, wherein the coordinate valued functions are second degree Bezier functions defined over Bezier triangles.

11. A computer graphics device according to claim 7, the implicit surface model being defined by means of a function of coordinate values, coordinates of all points on the surface resulting in the same function value, wherein the computing unit computes the points of the second mesh by adding a term in a direction of a local gradient of said function to the points of the first mesh.

12. A computer graphics device according to claim 8, wherein the computing unit computes a part of the corner points of the second mesh of flat triangles being computed from the second mesh of control points, a remaining part of the cornerpoints of the second mesh of flat triangles being copied from the cornerpoints of the first mesh of flat triangles, the device adjusting a size of said part so that the amount of computation required for the method is kept below a maximum allowable under real-time constraints.

* * * * *